(12) United States Patent
Chen et al.

(10) Patent No.: US 9,733,501 B2
(45) Date of Patent: Aug. 15, 2017

(54) ARRAY SUBSTRATE OF LIQUID CRYSTAL DISPLAY AND LIQUID CRYSTAL DISPLAY

(71) Applicant: WUHAN CHINA STAR OPTOELECTRONICS TECHNOLOGY CO., LTD., Wuhan, Hubei (CN)

(72) Inventors: Caiqin Chen, Hubei (CN); Qipei Zhang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 14/995,012

(22) Filed: Jan. 13, 2016

(65) Prior Publication Data

US 2017/0123252 A1    May 4, 2017

(30) Foreign Application Priority Data

Oct. 29, 2015    (CN) .......................... 2015 1 0719064

(51) Int. Cl.
  *G02F 1/133*    (2006.01)
  *G02F 1/1362*    (2006.01)
(52) U.S. Cl.
  CPC .... *G02F 1/13306* (2013.01); *G02F 1/136286* (2013.01)

(58) Field of Classification Search
  None
  See application file for complete search history.

(56) References Cited

U.S. PATENT DOCUMENTS

2004/0259326 A1* 12/2004 Hideo ............... G02F 1/136277
                                                438/458
2015/0362812 A1* 12/2015 Aoki .................... G02B 6/0011
                                                362/611

* cited by examiner

*Primary Examiner* — Ashok Patel
(74) *Attorney, Agent, or Firm* — Kirton McConkie; Evan R. Witt

(57) ABSTRACT

An array substrate of a liquid crystal display is provided, and includes a glass substrate; and a driving circuit for generating a data signal and a scanning signal, and driving components in a display area. The driving circuit is disposed on the periphery of the glass substrate. The driving circuit includes a flexible circuit board and a driver chip disposed on the flexible circuit board. The driver chip and the flexible circuit board are integrally combined. In the array substrate, it is not necessary to dispose the driver chip on the glass substrate, so as to not only ensure that the display area is a full circle, but to also reduce the width of the periphery of the liquid crystal display, and therefore actually achieving the display effect with a narrow border.

8 Claims, 3 Drawing Sheets

ARRAY SUBSTRATE OF LIQUID CRYSTAL DISPLAY AND LIQUID CRYSTAL DISPLAY

FIELD OF THE INVENTION

The present invention relates to the technical field of organic light-emission, and particularly to an array substrate of a liquid crystal display and a liquid crystal display.

BACKGROUND OF THE INVENTION

With the rapid development of society and the general improvement of living standards, people have increasingly higher demand for the appearance of liquid crystal displays. The appearance of liquid crystal displays (LCD) are demanded to be not only simple and delicate, but also stylish and elegant. For this reason, wearable and specially-shaped liquid crystal displays are more urgently demanded in current digital electronic products. For example, circular LCDs in smart watches are very popular with everyone. However, the structure of the array substrate of certain circular liquid crystal displays in the prior art has a significant disadvantage: the driver chip and the flexible circuit board both disposed on the array substrate occupy a large area of the array substrate, and cannot achieve the actual meaning of the circular displaying effect of circular displays.

SUMMARY OF THE INVENTION

A primary object of the present invention is to provide an array substrate of a liquid crystal display and a liquid crystal display for achieving a circular display effect.

The technical solutions of the present invention are as follows:

An array substrate of a liquid crystal display is provided, comprising:

a glass substrate; and a driving circuit for generating a data signal and a scanning signal, and driving components in a display area;

wherein the driving circuit is disposed on a periphery of the glass substrate, the driving circuit includes a flexible circuit board and a driver chip disposed on the flexible circuit board, and the driver chip and the flexible circuit board are integrally combined.

Preferably, a shape of the driving circuit is an annular shape.

Preferably, a shape of the driving circuit is an elliptical annular shape.

Preferably, a fanout wire is disposed on the glass substrate on an inner edge of the driving circuit, and a shape of the fanout wire corresponds to the shape of the driving circuit.

Preferably, the fanout wire is connected to a scanning line and a data line in the display area.

Preferably, the data signal generated by the driver chip is transmitted to the fanout wire, through the flexible circuit board and to the data line through the fanout wire.

Preferably, the scanning signal generated by the driver chip is transmitted to the fanout wire through the flexible circuit board, and to the scanning line through the fanout wire.

A liquid crystal display is provided, comprising:

an array substrate of a liquid crystal display including:

a glass substrate; and a driving circuit for generating a data signal and a scanning signal, and driving components in a display area;

wherein the driving circuit is disposed on a periphery of the glass substrate, the driving circuit includes a flexible circuit board and a driver chip disposed on the flexible circuit board, and the driver chip and the flexible circuit board are combined integrally.

Preferably, a fanout wire is disposed on the glass substrate on an inner edge of the driving circuit, and a shape of the fanout wire corresponds to the shape of the driving circuit.

Preferably, the fanout wire is connected to a scanning line and a data line in the display area.

The beneficial effects of the present invention:

In an array substrate of a liquid crystal display and a liquid crystal display of the present invention, the driver chip is combined with the flexible circuit board with the annular or other similarly annular structure, and then the flexible circuit board is combined on the periphery of the glass substrate, so that the data lines and the scanning lines of the liquid crystal display are outputted from the flexible circuit board. It is not necessary to re-dispose the driver chip on the glass substrate, which not only ensures that the display area is a full circle, but also reduces the width of the periphery of the liquid crystal display, and therefore actually achieving the display effect with a narrow border.

DETAILED DESCRIPTION OF THE PREFERRED EMBODIMENTS

The following description of the embodiments with reference to the accompanying drawings is used to illustrate particular embodiments of the present invention. The directional terms referred in the present invention, such as "upper", "lower", "front", "after", "left", "right", "inner", "outer", "side surface", etc. are only directions with regard to the accompanying drawings. Therefore, the directional terms used for describing and illustrating the present invention are not intended to limit the present invention.

Embodiment 1

Figure 1:
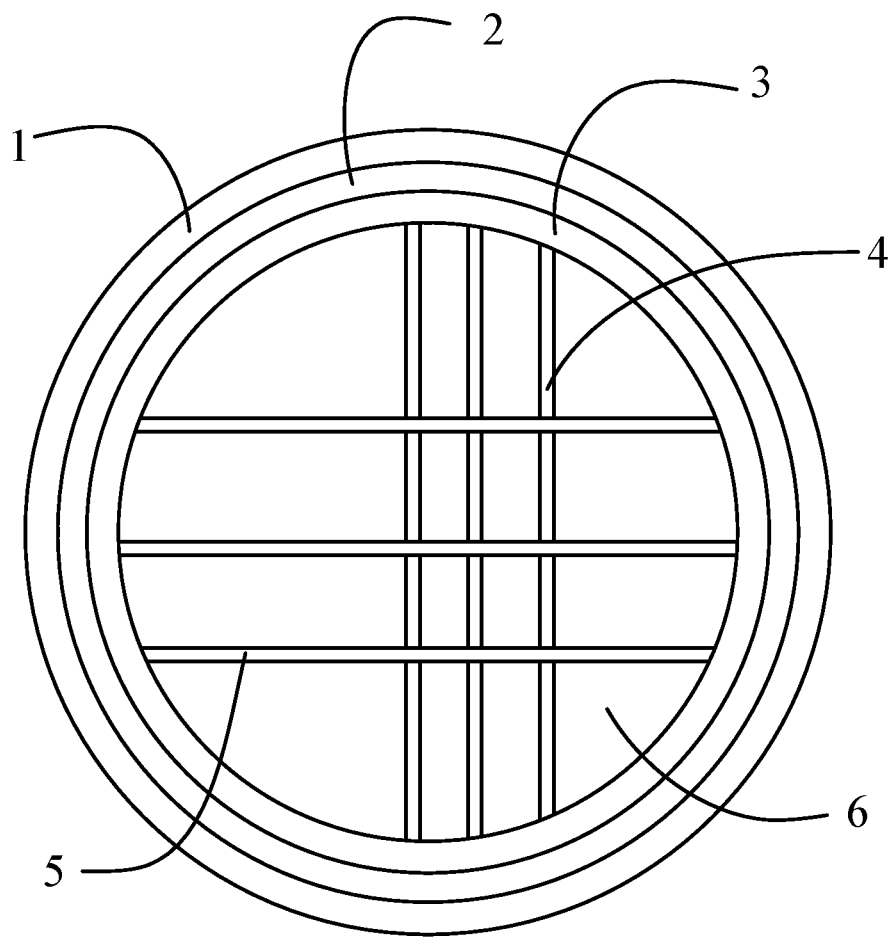
FIG. 1 is a structural schematic diagram of an array substrate of a circular liquid crystal display of the present invention.
Figure 2:
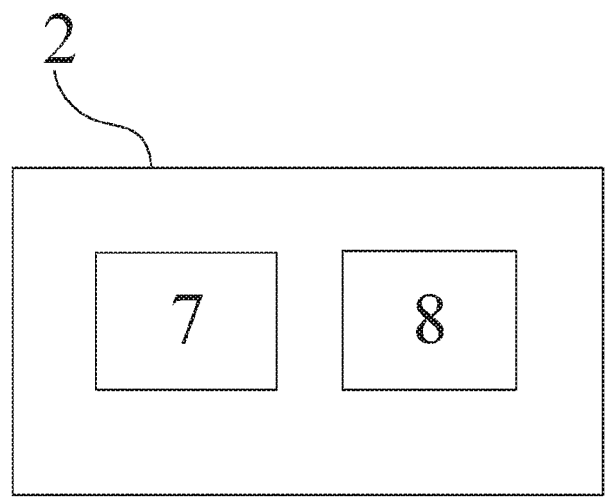
FIG. 2 is a schematic diagram showing that the driving circuit includes a flexible circuit board and a driver chip.

Refer to FIGS. 1 and 2, where FIG. 1 is a structural schematic diagram of an array substrate of a circular liquid crystal display of the present invention, and FIG. 2 is a schematic diagram showing that the driving circuit includes a flexible circuit board and a driver chip. In FIGS. 1 and 2, it can be seen that the array substrate of the liquid crystal display of the present invention includes a glass substrate 1 and a driving circuit 2 for generating a data signal 4 and a scanning signal 5, and driving components in a display area 6. The driving circuit 2 is located on the periphery near the border of the glass substrate 1.

In this embodiment, the driving circuit 2 includes a flexible circuit board 8 and a driver chip 7, the driver chip 7 is disposed on the flexible circuit board 8, and the driver chip 7 and the flexible circuit board 8 are integrally combined. Since the flexible circuit 8 may be changed into different shapes, and the driver chip 7 is disposed on the flexible circuit board 8, therefore, after the driving circuit 2 is changed into a shape corresponding to the glass substrate 1 based upon the shape of the outer border of the glass substrate 1, the driving circuit 2 is then disposed on the glass substrate 1.

Preferably, in the embodiment, the shape of the driving circuit is an annular shape or an elliptical annular shape.

In the embodiment, a fanout wire 3 is disposed on the glass substrate 1 on an inner edge of the driving circuit 2, the output ends of the fanout wire 3 are connected to the input ends of the scanning line 5 and the data line 4 in the display area 6, and the shape of the fanout wire 3 on the glass substrate 1 corresponds to the shape of the driving circuit 2.

In the embodiment, the data signal generated by the driver chip 7 is transmitted to the fanout wire 3 through the flexible circuit board 8, and to the data lines 4 through the fanout wire 3.

In the embodiment, the scanning signal generated by the driver chip 7 is transmitted to the fanout wire 3 through the flexible circuit board 8, and to the scanning lines 5 through the fanout wire 3.

Figure 3:
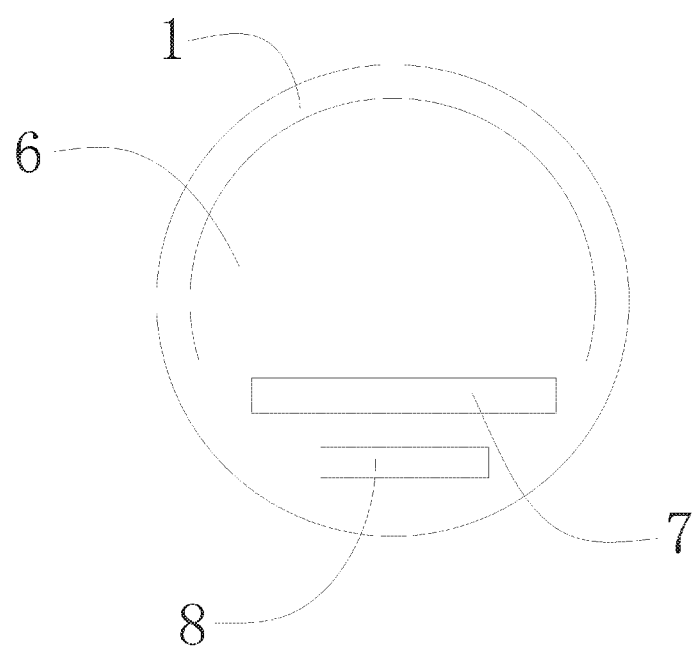
FIG. 3 is a structural schematic diagram of an array substrate of a circular liquid crystal display in a prior art.

Refer to FIG. 3, which is a structural schematic diagram of an array substrate of a circular liquid crystal display in a prior art. In FIG. 3, it can be seen that in the circular array substrate of the liquid crystal display in the prior art. The driver chip 7 and the flexible circuit board 8 are respectively disposed at different positions on the glass substrate 1, and hence need to occupy large areas of the array substrate. However, these occupied areas cannot functionally display, thus making the display area 6 smaller, and not achieving the actual meaning of the circular displaying effect of circular displays. The design of the array substrate in the prior art cannot broaden the display area of the array substrate, and even cannot achieve the purpose of the narrow border. In the array substrate of the embodiment, the driver chip 7 is disposed on the flexible circuit board 8, and the flexible circuit board 8 is arranged in a circular configuration, so as to not only expand the display area 6, but also reduce the width of the border of the array substrate, for achieving the purpose of the narrow border.

Embodiment 2

In the embodiment, a liquid crystal display includes an array substrate. The array substrate, as shown in FIG. 1, includes a glass substrate 1 and a driving circuit 2 for generating a data signal and a scanning signal, and driving components in a display area 6.

The driving circuit 2 is disposed on the periphery of the glass substrate 1. In this embodiment, the driving circuit 2 includes a flexible circuit board 8 and a driver chip 7, the driver chip 7 is disposed on the flexible circuit board 8, and the driver chip 7 and the flexible circuit board 8 are integrally combined. Since the flexible circuit 8 may be changed into different shapes, and the driver chip 7 is disposed on the flexible circuit board 8, after the driving circuit 2 is changed into a shape corresponding to the glass substrate 1 based upon the shape of the outer border of the glass substrate 1, the driving circuit 2 is then disposed on the glass substrate 1.

In the embodiment, the driving circuit 2 includes a flexible circuit board 8 and a driver chip 7 disposed on the flexible circuit board 8, and the driver chip 7 and the flexible circuit board 8 are combined integrally.

In the embodiment, a fanout wire 3 is disposed on the glass substrate 1 on an inner edge of the driving circuit 2, the output ends of the fanout wire 3 are connected to the input ends of the scanning line 5 and the data line 4 in the display area 6, and the shape of the fanout wire 3 on the glass substrate 1 corresponds to the shape of the driving circuit 2.

In the embodiment, the data signal generated by the driver chip 7 is transmitted to the fanout wire 3 through the flexible circuit board 8, and to the data lines 4 through the fanout wire 3.

In the embodiment, the scanning signal generated by the driver chip 7 is transmitted to the fanout wire 3 through the flexible circuit board 8, and to the scanning lines 5 through the fanout wire 3.

In summary, although the preferable embodiments of the present invention have been disclosed above, the embodiments are not intended to limit the present invention. A person of ordinary skill in the art, without departing from the spirit and scope of the present invention, can make various modifications and variations. Therefore, the scope of the invention is defined in the claims.

What is claimed is:

1. An array substrate of a liquid crystal display, comprising:
    a glass substrate; and
    a driving circuit for generating a data signal and a scanning signal, and driving components in a display area;
    wherein the driving circuit is disposed on a periphery of the glass substrate, the driving circuit includes a flexible circuit board and a driver chip disposed on the flexible circuit board, and the driver chip and the flexible circuit board are integrally combined;
    wherein a fanout wire is disposed on the glass substrate on an inner edge of the driving circuit, and a shape of the fanout wire corresponds to the shape of the driving circuit.

2. The array substrate as claimed in claim 1, wherein a shape of the driving circuit is an annular shape.

3. The array substrate as claimed in claim 1, wherein a shape of the driving circuit is an elliptical annular shape.

4. The array substrate as claimed in claim 1, wherein the fanout wire is connected to a scanning line and a data line in the display area.

5. The array substrate as claimed in claim 4, wherein the data signal generated by the driver chip is transmitted to the fanout wire through the flexible circuit board, and to the data line through the fanout wire.

6. The array substrate as claimed in claim 4, wherein the scanning signal generated by the driver chip is transmitted to the fanout wire through the flexible circuit board, and to the scanning line through the fanout wire.

7. A liquid crystal display, comprising:
    an array substrate of a liquid crystal display including:
        a glass substrate; and
        a driving circuit for generating a data signal and a scanning signal, and driving components in a display area;
        wherein the driving circuit is disposed on a periphery of the glass substrate, the driving circuit includes a flexible circuit board and a driver chip disposed on the flexible circuit board, and the driver chip and the flexible circuit board are combined integrally;
        wherein a fanout wire is disposed on the glass substrate on an inner edge of the driving circuit, and a shape of the fanout wire corresponds to the shape of the driving circuit.

8. The array substrate as claimed in claim 7, wherein the fanout wire is connected to a scanning line and a data line in the display area.

* * * * *